US012737308B2

(12) United States Patent
Sun et al.

(10) Patent No.: US 12,737,308 B2
(45) Date of Patent: Sep. 15, 2026

(54) DATA RECORDING METHOD AND APPARATUS, AND ELECTRONIC DEVICE AND NONVOLATILE READABLE STORAGE MEDIUM

(71) Applicant: SUZHOU METABRAIN INTELLIGENT TECHNOLOGY CO., LTD., Suzhou (CN)

(72) Inventors: Xiuqiang Sun, Suzhou (CN); Fenghua Ye, Suzhou (CN); Kaizhi Lin, Suzhou (CN); Daotong Li, Suzhou (CN); Bing Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/470,274

(22) PCT Filed: Dec. 13, 2024

(86) PCT No.: PCT/CN2024/139400
§ 371 (c)(1),
(2) Date: Oct. 14, 2025

(87) PCT Pub. No.: WO2025/189877
PCT Pub. Date: Sep. 18, 2025

(65) Prior Publication Data

US 2026/0119417 A1 Apr. 30, 2026

(30) Foreign Application Priority Data

Mar. 13, 2024 (CN) ......................... 202410282789.8

(51) Int. Cl.

| | |
|---|---|
| ***G06F 13/16*** | (2006.01) |
| ***G06F 9/44*** | (2018.01) |
| ***G06F 9/4401*** | (2018.01) |
| ***G06F 11/34*** | (2006.01) |

(52) U.S. Cl.
CPC ........ *G06F 13/1663* (2013.01); *G06F 9/4405* (2013.01); *G06F 11/3476* (2013.01); *G06F 2213/0016* (2013.01)

(58) Field of Classification Search
CPC ............... G06F 13/1663; G06F 9/4405; G06F 11/3476; G06F 2213/0016; G06F 1/24; G06F 15/167
See application file for complete search history.

(56) References Cited

U.S. PATENT DOCUMENTS

2013/0117766 A1* 5/2013 Bax ....................... G06F 9/4401 719/323
2017/0177457 A1* 6/2017 Swanson ............ G06F 11/1016
(Continued)

FOREIGN PATENT DOCUMENTS

CN 113076213 A 7/2021
CN 115934447 A 4/2023
(Continued)

OTHER PUBLICATIONS

International Search Report dated Feb. 18, 2025 issued in PCT/CN2024/139400.
(Continued)

*Primary Examiner* — Masud K Khan
(74) *Attorney, Agent, or Firm* — Scully, Scott, Murphy & Presser, P.C.

(57) ABSTRACT

A method for recording data and an apparatus, an electronic device and a non-transitory computer readable storage medium is provided, and relates to the field of computer technologies. The method includes: configuring a BIOS and a BMC to share a shared memory of a CPU respectively, wherein the shared memory is a preset area of a memory mounted by the CPU; establishing a rule for using the shared memory for the BIOS and the BMC; when a server is started, checking a shared channel for the shared memory to deter- (Continued)

mine whether the shared memory is successfully initialized; and transferring data related to RAS collected by the BIOS to the BMC via the shared memory based on the rule for using the shared memory, in a case where the shared memory is successfully initialized.

20 Claims, 5 Drawing Sheets

(56) References Cited

U.S. PATENT DOCUMENTS

| | | | | |
|---|---|---|---|---|
| 2020/0257517 | A1* | 8/2020 | Seater | G06F 1/3206 |
| 2023/0325201 | A1* | 10/2023 | Suryanarayana | G06F 9/544<br>713/2 |
| 2023/0393944 | A1 | 12/2023 | Sun et al. | |

FOREIGN PATENT DOCUMENTS

| | | | |
|---|---|---|---|
| CN | 116991606 | A | 11/2023 |
| CN | 117687695 | A | 3/2024 |
| CN | 117873853 | A | 4/2024 |

OTHER PUBLICATIONS

Chinese First Office Action dated Apr. 18, 2024 issued in CN 202410282789.8.

* cited by examiner

DATA RECORDING METHOD AND APPARATUS, AND ELECTRONIC DEVICE AND NONVOLATILE READABLE STORAGE MEDIUM

CROSS-REFERENCE TO RELATED APPLICATIONS

The present disclosure is a National Stage Entry under 35 U.S.C. § 371 of PCT International Application No. PCT/CN2024/139400, filed on Dec. 13, 2024, which claims priority to Chinese Patent Application No. 202410282789.8, filed to the China National Intellectual Property Administration on Mar. 13, 2024 and entitled "Method for recording data and Apparatus, Electronic Device and Medium", the entire contents of each of which are incorporated herein by reference for all purposes.

TECHNICAL FIELD

The present disclosure relates to the field of computer technologies, and in particular, to a method for recording data and apparatus, an electronic device, and a non-transitory computer readable storage medium.

BACKGROUND

The full name of RAS is Reliability, Availability and Serviceability. The RAS functions are important constituent parts for stable running of a server system. As the server system needs to run stably for a long time, the RAS, as a whole, functions to ensure that the whole system runs as reliably as possible for a long time without being offline, and has a sufficiently powerful fault-tolerant mechanism.

At present, all mainstream and traditional server products on the market need to support RAS functions, and core management and identification records of the RAS functions are all actively identified by a Basic Input Output System (BIOS) and corresponding reporting and processing actions are performed. A common processing method in the industry is to perform remote viewing by a Baseboard Management Controller (BMC) instead of collecting registers recorded by the BIOS or error logs recorded in the system. In this case, the BIOS needs to report actively identified RAS error information to a BMC in a certain manner. Communication protocols supported by Central Processing Units (CPUs) of different architectures are different, thus the adopted methods are also different. For example, a KCS interface (Keyboard Controller Style interface) of an LPC (Low Pin Count) bus performs RAS error information exchange between the BIOS and the BMC, and information reporting and transfer of the RAS functions is performed using an IPMI (Intelligent Platform Management Interface) protocol in an Inter-Integrated Circuit (I2C) mode. No matter which method is used, corresponding physical link support is required to implement application of upper-layer software. However, transfer by the KCS method is limited by the number of times, and a maximum of 255 system management interrupts can be supported. However the system management interrupts are used in a plurality of situations, which leads to the problem of insufficient system management interrupts available for the RAS functions or the problem of system performance degradation due to frequent use of the system management interrupts. Accordingly, there is an urgent need to improve the existing recording methods of RAS-type data.

SUMMARY

The present disclosure provides a method for recording data and apparatus, an electronic device and a non-transitory computer readable storage medium, so as to solve the defects of existing methods wherein records of data related to RAS function are affected by a server architecture, leading to reduced server performance.

According to a first aspect of the present disclosure, the present disclosure provides a method for recording data. The method includes:

- respectively configuring a Basic Input Output System (BIOS) and a Baseboard Management Controller (BMC) to share a shared memory of a Central Processing Unit (CPU), wherein the shared memory is a preset area of a memory mounted by the CPU;
- establishing a rule for using the shared memory for the BIOS and the BMC;
- in a case where a server is started, checking a shared channel for the shared memory to determine whether the shared memory is successfully initialized; and
- transferring data related to Reliability, Availability and Serviceability (RAS) function collected by the BIOS to the BMC via the shared memory based on the rule for using the shared memory, in a case where the shared memory is successfully initialized.

In some embodiments, wherein respectively configuring the BIOS and the BMC to share the shared memory of the CPU, includes:

- mounting at least one memory bank to the CPU on a main board via an inter-integrated circuit (I2C) bus;
- respectively connecting the BIOS and the BMC to the CPU via a preset bus; and
- allocating a storage space of the at least one memory bank, which is mapped to the CPU, for shared use by the BIOS and the BMC.

In some embodiments, wherein the preset bus is an Enhanced Serial Peripheral Interface (ESPI) bus or a Low Pin Count (LPC) bus.

In some embodiments, wherein establishing the rule for using the shared memory for the BIOS and the BMC, includes:

- establishing a rule that after the BIOS acquires the data related to RAS function, the BIOS encapsulates the data related to RAS function and data related to an interrupt of the BMC into a preset structure data packet based on a preset rule for combining data, and writes the preset structure data packet into the shared memory; and
- establishing a rule that when the BMC reads the shared memory, the BMC parses the preset structure data packet based on a preset rule for parsing data to obtain the data related to RAS function, and displays the data related to RAS function via a management interface.

In some embodiments, wherein in a case where the server is started, checking the shared channel for the shared memory to determine whether the shared memory is successfully initialized, includes:

- controlling the BIOS to read a first preset address of the shared memory in a startup phase to obtain a startup signal of the BMC, a reset signal of the BMC and an initialization state of the BMC;
- determining that the shared memory is successfully initialized in a case where the startup signal of the BMC and the reset signal of the BMC and the initialization state of the BMC are all equal to respective corresponding preset values; and determining that the shared memory fails to be initialized in a case where any one of the startup signal of the BMC, the reset signal of the BMC and the initialization state of the BMC is not equal to a corresponding preset value.

In some embodiments, wherein in a case where the server is started, checking the shared channel for the shared memory to determine whether the shared memory is successfully initialized, includes:

controlling the BMC to read a second preset address of the shared memory in a startup phase to obtain a startup signal of the BIOS, a reset signal of the BIOS and an initialization state of the BIOS;

determining that the shared memory is successfully initialized in a case where the startup signal of the BIOS, the reset signal of the BIOS and the initialization state of the BIOS are all equal to respective corresponding preset values; and determining that the shared memory fails to be initialized in a case where any one of the startup signal of the BIOS, the reset signal of the BIOS and the initialization state of the BIOS is not equal to a corresponding preset value.

In some embodiments, wherein the shared channel includes data communication channels respectively from the BIOS and the BMC to the shared memory.

In some embodiments, wherein in a case where the server is started, checking the shared channel for the shared memory to determine whether the shared memory is successfully initialized, includes:

detecting whether the shared channel exists;

determining that the shared memory is successfully initialized in a case where the shared channel is detected; and determining that the shared memory fails to be initialized in a case where the shared channel is not detected.

In some embodiments, wherein detecting whether the shared channel exists, includes:

detecting whether a data communication channel from the BIOS to the shared memory exists, and detecting whether a data communication channel from the BMC to the shared memory exists; and determining that the shared channel is detected in a case where both the data communication channel from the BIOS to the shared memory and the data communication channel from the BMC to the shared memory exist.

In some embodiments, wherein transferring the data related to RAS function collected by the BIOS to the BMC based on the rule for using the shared memory via the shared memory, includes:

controlling the BIOS to acquire a data packet of the data related to the interrupt of the BMC from a buffer of the shared memory, and determine whether the data packet is empty;

in response to the data packet being not empty, controlling the BMC to: acquire, via the shared memory, the preset structure data packet transferred by the BIOS based on the rule for using the shared memory, parse the preset structure data packet based on the rule for using the shared memory to obtain the data related to RAS function, and then display the data related to RAS function via the management interface; and in response to the data packet being empty, controlling the BIOS to wait for the data packet related to the interrupt.

In some embodiments, wherein the buffer of the shared memory includes: a first buffer and a second buffer, wherein the first buffer is configured to buffer data transmitted by the BMC, and the second buffer is configured to buffer data received by the BMC.

In some embodiments, wherein the method further includes:

counting time spent waiting by the BIOS for the data packet of the data related to the interrupt to obtain a waiting time; and controlling the server to skip a process of exchanging the data related to RAS function between the BIOS and the BMC, and continue to execute a startup process, in a case where the waiting time exceeds a preset time.

In some embodiments, wherein the method further includes:

controlling the server to skip a process of exchanging the data related to RAS function between the BIOS and the BMC, and continuing to execute a startup process, in a case where the shared memory fails to be initialized.

In some embodiments, wherein the data related to RAS function includes RAS-type error information and RAS-type location information.

In some embodiments, wherein the preset structure data packet at least includes following information: a defined flag, a defined version, an exchange count, a next data address, a data address of a first buffer, a data address of a second buffer, a data length of the first buffer, a data length of the second buffer, a buffer type, a target buffer type, data read by BIOS, data written by BIOS, a message protocol type, a BIOS interrupt type, global system input data, a BMC interrupt type, a BMC interrupt address, a BMC interrupt value, and a data check value.

In some embodiments, wherein the rule for using the shared memory defines a manner that the BIOS and the BMC perform data exchange via one or more data packets of a preset format.

In some embodiments, wherein the preset area is a storage area formed by a segment of contiguous addresses, or the preset area is a storage area formed by multiple non-contiguous segments of addresses.

According to a second aspect of the present disclosure, the present disclosure further provides an apparatus for recording data. The apparatus includes:

a configuration module, configured to respectively configure a BIOS and a BMC to share a shared memory of a CPU respectively, wherein the shared memory is a preset area of a memory mounted by the CPU;

an establishment module, configured to establish a rule for using the shared memory for the BIOS and the BMC;

a checking module, configured to check, in a case where a server is started, a shared channel for the shared memory to determine whether the shared memory is successfully initialized; and a transfer module, configured to transfer data related to RAS function collected by the BIOS to the BMC via the shared memory based on the rule for using the shared memory, in a case where the shared memory is successfully initialized.

According to a third aspect of the present disclosure, the present disclosure further provides an electronic device, including a memory, a processor, and a computer program stored on the memory and executable on the processor, wherein the processor implements the method for recording data according to any one above when executing the program.

According to a fourth aspect of the present disclosure, the present disclosure further provides a non-transitory computer readable storage medium having a computer program stored thereon, wherein the computer program, when executed by a processor, implements the method for recording data according to any one above.

According to the method for recording data provided in the present disclosure, first a basic input output system and a baseboard management controller are respectively configured to share a shared memory of a Central Processing Unit; then a rule for using the shared memory is established for the basic input output system and the baseboard management controller; when a server is started, a shared channel is checked for the shared memory to determine whether the shared memory is successfully initialized; and finally, if the shared memory is successfully initialized, based on the established rule for using the shared memory, data related to RAS function collected by the Basic Input Output System is transferred to the Baseboard Management Controller via the shared memory, which not only enriches the recording method of RAS-type data, but also enables records of data related to RAS function not to be affected or limited by the architecture of a server chip, and has the characteristics of strong universality and high applicability.

In addition, the present disclosure provides an apparatus for recording data, an electronic device, and a non-transitory computer readable storage medium, which can also achieve the technical effects, and details will not be repeated herein.

BRIEF DESCRIPTION OF THE DRAWINGS

In order to describe the technical solutions in the present disclosure or in the related art more clearly, hereinafter, accompanying drawings requiring to be used in the embodiments or the related art will be introduced briefly. Apparently, the accompanying drawings in the following description merely relate to some embodiments of the present disclosure, and for a person of ordinary skill in the art, other accompanying drawings can also be obtained according to these accompanying drawings without involving any inventive effort.

DETAILED DESCRIPTION OF THE EMBODIMENTS

In order to make objects, technical solutions and advantages of some embodiments of the present disclosure clearer, hereinafter, the technical solutions in some embodiments of the present disclosure will be described clearly and thoroughly with reference to the accompanying drawings in the present disclosure. Obviously, the embodiments as described are only some of the embodiments of the present disclosure, and are not all of the embodiments of the present disclosure. All other embodiments obtained by a person of ordinary skill in the art on the basis of the embodiments of the present disclosure without any inventive effort shall all fall within the scope of protection of some embodiments of the present disclosure.

For ease of understanding, first, the following description is made for technical terms mentioned in the embodiments of the present disclosure:

BIOS: Basic Input Output System, which stores the most important basic input output program of a computer, system setting information, self-check program after start-up and self-triggered program of a system;

BMC: Baseboard Management Controller, which is a core component for out-of-band management of a server;

I2C: Inter-Integrated Circuit;

CPU: Central Processing Unit;

GPIO: General-purpose input output;

IPMI: Intelligent Platform Management Interface;

LPC: Low Pin Count, which is a low-speed bus protocol and is a 33 MHz 4 bit parallel bus protocol based on Intel standard;

KCS: Keyboard Controller Style (KCS) Interface, KCS interface for short;

MMBI: Memory-Mapped BMC Interface, which is a memory-mapped buffer area interface, and is a shared memory area for data packet exchange between the BIOS and the BMC;

H2B: Host to BMC, host to baseboard management controller, i.e. sending data communication in a direction from the Host to the BMC;

B2H: BMC to Host, baseboard management controller to host, i.e. sending data communication in a direction from the BMC to the Host;

RAS: Reliability, Availability, and Serviceability; and

ESPI: Enhanced Serial Peripheral Interface, wherein an ESPI bus is a bus standard with high performance and high reliability, is used for connecting devices and sensors in a computer system, adopts a point-to-point communication model, supports high-speed data transmission and DMA-based data transmission, and also has a perfect communication protocol.

Hereinafter, a method for recording data, an apparatus for recording data, an electronic device, and a non-transitory computer readable storage medium in some embodiments of the present disclosure are described with reference to FIG. 1 to FIG. 8.

Figure 1:
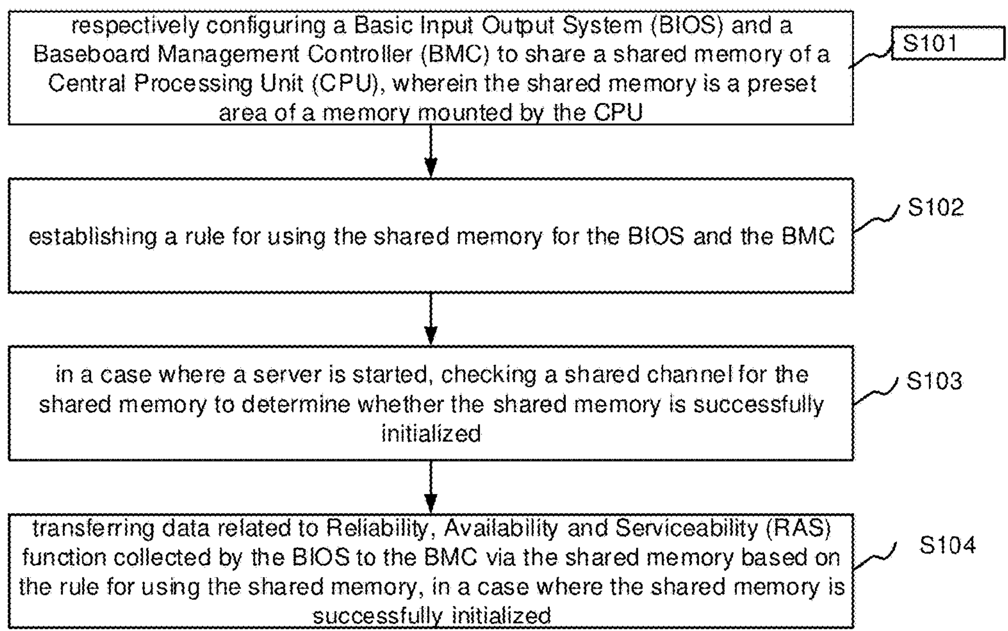
FIG. 1 is a schematic flowchart I of a method for recording data provided according to some embodiments of the present disclosure.

FIG. 1 is a schematic flowchart I of a method for recording data provided according to some embodiments of the present disclosure. As shown in FIG. 1, the present embodiment provides a method for recording data. The method can be implemented through step S101 to step S104. Hereinafter, the method is described in detail with reference to each step:

Step S101: respectively configuring a Basic Input Output System (BIOS) and a Baseboard Management Controller (BMC) to share a shared memory of a Central Processing Unit (CPU), wherein the shared memory is a preset area of a memory mounted by the CPU.

In this embodiment, the memory is mounted under the central processing unit by any existing bus, and when the shared memory is configured, first the basic input output system and the baseboard management controller may be connected to the central processing unit on a main board, and then the memory is operated by using the central processing unit, thereby implementing memory sharing. The preset area refers to a storage area with a specified size in the memory, and the preset area may be a storage area formed by a segment of contiguous addresses, or a storage area formed by multiple non-contiguous segments of addresses.

Step S102: establishing a rule for using the shared memory for the BIOS and the BMC.

In this embodiment, the shared memory use rule means that the basic input output system and the baseboard management controller implement data exchange via one or more data packets of a preset format, the basic input output system and the baseboard management controller can transfer data to each other according to a certain rule on the basis of the established memory use rule, and the baseboard management controller can further parse the transferred data according to a certain rule.

Step S103: in a case where a server is started, checking a shared channel for the shared memory to determine whether the shared memory is successfully initialized.

In this embodiment, the shared channel includes data communication channels respectively from the basic input output system and the baseboard management controller to the shared memory, and the corresponding shared channel checking refers to checking the data channel from the basic input output system to the shared memory, and checking the data communication channel from the baseboard management controller to the shared memory. After the configuration of the shared memory is completed, the shared channel should exist after the initialization of the shared memory, and therefore the initialization state of the shared memory may be indicated according to the check result of the shared channel. The method includes determining that the initialization of the shared memory is successful in a case where the shared channel is detected; and determining that the initialization of the shared memory fails in a case where the shared channel is not detected.

Step S104: transferring data related to Reliability, Availability and Serviceability (RAS) function collected by the BIOS to the BMC via the shared memory based on the rule for using the shared memory, in a case where the shared memory is successfully initialized. In some embodiments, the data related to RAS function includes RAS-type error information and RAS-type location information.

Exemplarily, in cases where the initialization of the shared memory is successful, by using the pre-established memory use rule of the basic input output system and the baseboard management controller, the baseboard management controller end and the basic input output system end set data packets and parameter meanings corresponding to offset addresses in the data packets for exchange, the basic input output system combines the data related to the RAS function according to the established rule and transfers it to the baseboard management controller, and the baseboard management controller parses the received data according to the established rule and displays the data related to RAS function via a management interface of the baseboard management controller.

According to the method for recording data of the present embodiment, first a basic input output system and a baseboard management controller are respectively configured to share a shared memory of a Central Processing Unit; then a rule for using the shared memory is established for use of the shared memory by the Basic Input Output System and the Baseboard Management Controller; when a server is started, a shared channel is checked for the shared memory to determine whether the shared memory is successfully initialized; and finally, if the shared memory is successfully initialized, based on the established rule for using the shared memory, data related to RAS function collected by the Basic Input Output System is transferred to the Baseboard Management Controller via the shared memory, which not only enriches the recording method of RAS-type data, but also enables data related to RAS function records not to be affected or limited by the architecture of a server chip, and has the characteristics of strong universality and high applicability.

Figure 2:
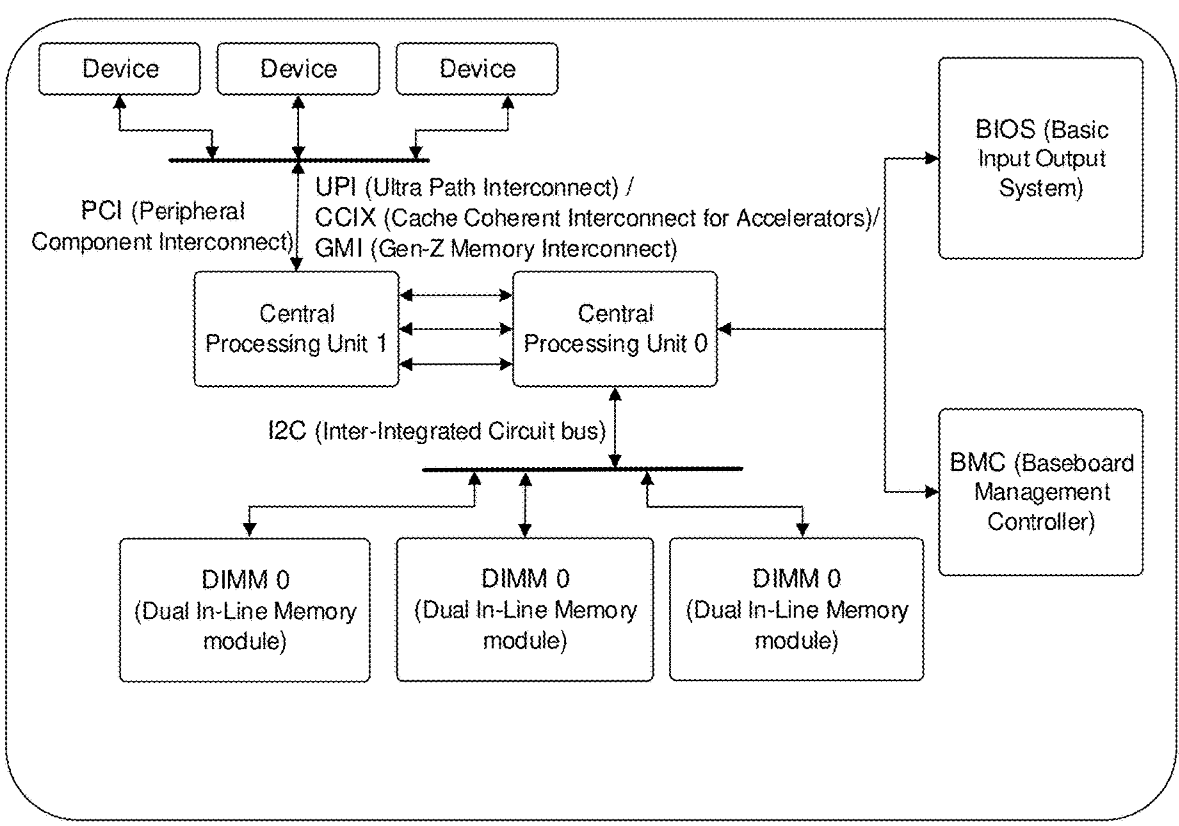
FIG. 2 is an overall schematic diagram of a physical topology structure of a server main board provided according to some embodiments of the present disclosure.

In some embodiments, please refer to FIG. 2, in step S104, the basic input output system and the baseboard management controller are configured to share the shared memory under the central processing unit respectively, includes the following steps:

- mounting at least one memory bank to the central processing unit on a main board via an I2C bus;
- respectively connecting the basic input output system and the baseboard management controller to the central processing unit via a preset bus; and
- allocating a storage space of the at least one memory bank, which is mapped to the central processing unit, for shared use by the basic input output system and the baseboard management controller.

In some embodiments, the preset bus is an Enhanced Serial Peripheral Interface (ESPI) bus or a Low Pin Count (LPC) bus.

The method for recording data of the present embodiment is based on a hardware physical link design of a main board server, uses the basic input output system and the baseboard management controller to share a memory channel via an ESPI bus or an LPC bus, and is applicable to most server architectures; and the constructed shared memory channel can allow the basic input output system and the baseboard management controller to transfer respective data, so as to prepare for subsequent data exchange between the two.

In some embodiments, in step S102, establishing the rule for using the shared memory for the BIOS and the BMC, includes:

- establishing a rule that after the BIOS acquires the data related to RAS function, the BIOS encapsulates the data related to RAS function and data related to an interrupt of the BMC into a preset structure data packet based on a preset rule for combining data, and writes the preset structure data packet into the shared memory; and
- establishing a rule that when the BMC reads the shared memory, the BMC parses the preset structure data packet based on a preset rule for parsing data to obtain the data related to RAS function, and displays the data related to RAS function via a management interface.

The method for recording data of the present embodiment establishs the shared memory use rule for the basic input output system and the baseboard management controller respectively, and after establishment, the basic input output system and the baseboard management controller can complete recording and transfer of the data related to RAS function in cooperation with the preset structure data packet.

Figure 3:
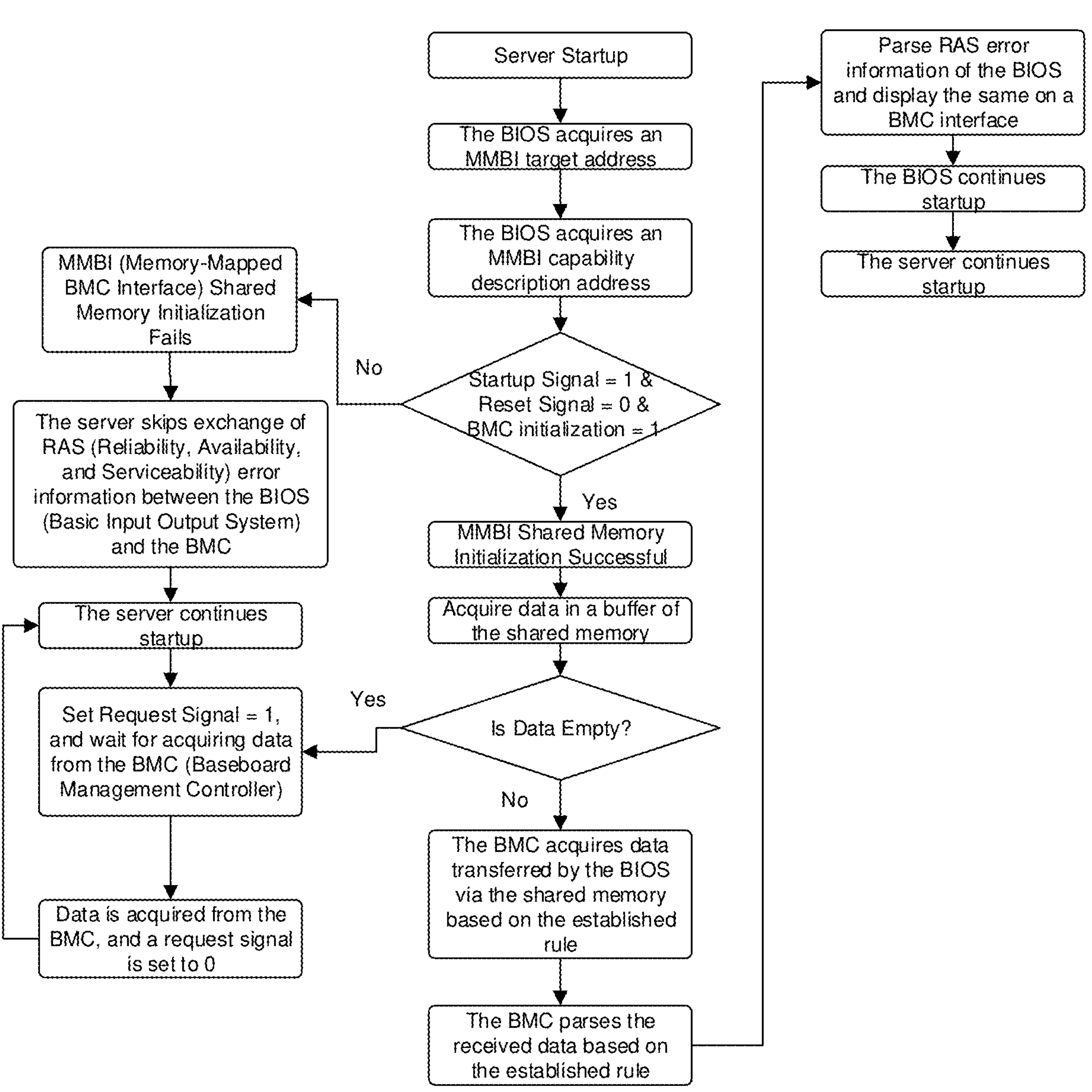
FIG. 3 is a schematic flowchart II of a method for recording data provided according to some embodiments of the present disclosure.

In some embodiments, please refer to FIG. 3, in step S103, in a case where the server is started, checking the shared channel for the shared memory to determine whether the shared memory is successfully initialized, includes:

- controlling the BIOS to read a first preset address of the shared memory in a startup phase to obtain a startup signal of the BMC, a reset signal of the BMC and an initialization state of the BMC;

determining that the shared memory is successfully initialized in a case where the startup signal of the BMC and the reset signal of the BMC and the initialization state of the BMC are all equal to respective corresponding preset values; and determining that the shared memory fails to be initialized in a case where any one of the startup signal of the BMC, the reset signal of the BMC and the initialization state of the BMC is not equal to a corresponding preset value.

In the method for recording data of the present embodiment, the basic input and output system checks whether the startup signal, the BMC initialization signal and the reset signal of the baseboard management controller comply with conditions, thereby realizing automatic determination of whether a shared memory MMBI area is available; and the whole process requires no manual operation, achieving relatively good stability and accuracy.

In some embodiments, please refer to FIG. 3 again, in step S103, in a case where the server is started, checking the shared channel for the shared memory to determine whether the shared memory is successfully initialized, includes:

controlling the BMC to read a second preset address of the shared memory in a startup phase to obtain a startup signal of the BIOS, a reset signal of the BIOS and an initialization state of the BIOS;

determining that the shared memory is successfully initialized in a case where the startup signal of the BIOS, the reset signal of the BIOS and the initialization state of the BIOS are all equal to respective corresponding preset values; and determining that the shared memory fails to be initialized in a case where any one of the startup signal of the BIOS, the reset signal of the BIOS and the initialization state of the BIOS is not equal to a corresponding preset value.

In the method for recording data of the present embodiment, the baseboard management controller checks whether the startup signal, the BMC initialization signal and the reset signal of the basic input and output system comply with conditions, thereby realizing automatic determination of whether a shared memory MMBI area is available; and the whole process requires no manual operation, achieving relatively good stability and accuracy.

Figure 4:
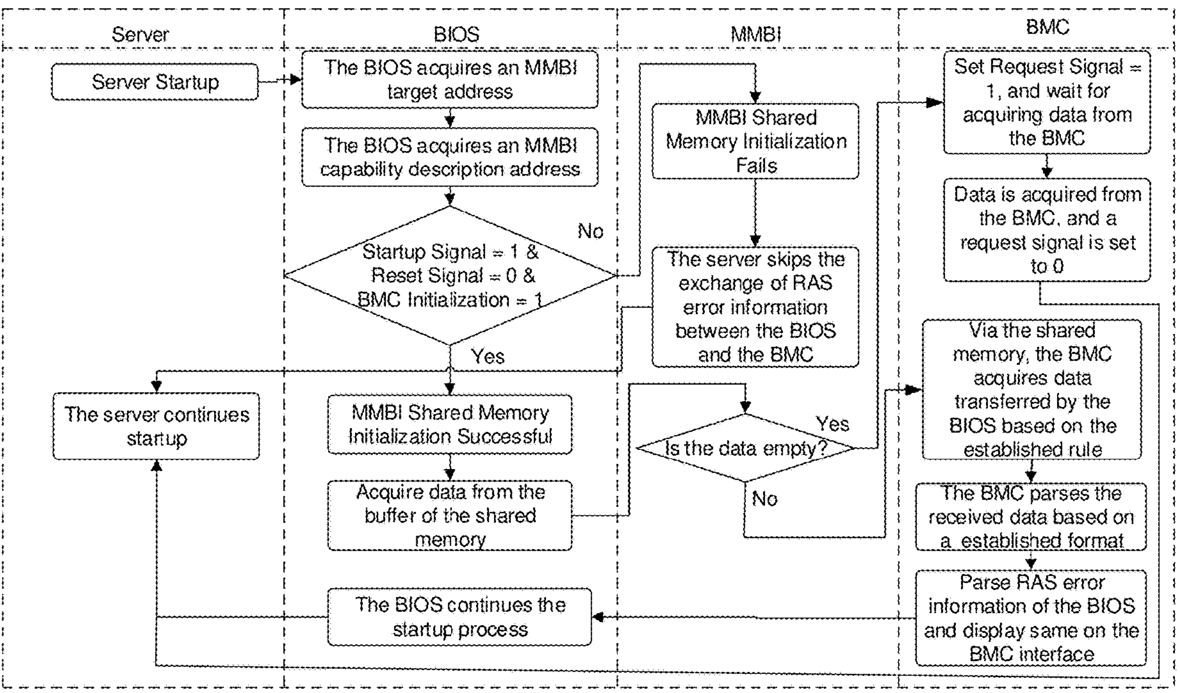
FIG. 4 is a swimlane diagram corresponding to the flow of the method for recording data of FIG. 3 provided according to some embodiments of the present disclosure.

In some embodiments, please refer to FIG. 4, in step S104, transferring the data related to RAS function collected by the BIOS to the BMC based on the rule for using the shared memory via the shared memory, includes:

controlling the BIOS to acquire a data packet of the data related to the interrupt of the BMC from a buffer of the shared memory, and determine whether the data packet is empty;

in response to the data packet being not empty, controlling the BMC to: acquire, via the shared memory, the preset structure data packet transferred by the BIOS based on the rule for using the shared memory, parse the preset structure data packet based on the rule for using the shared memory to obtain the data related to RAS function, and then display the data related to RAS function via the management interface; and in response to the data packet being empty, controlling the BIOS to wait for the data packet related to the interrupt.

Figure 5:
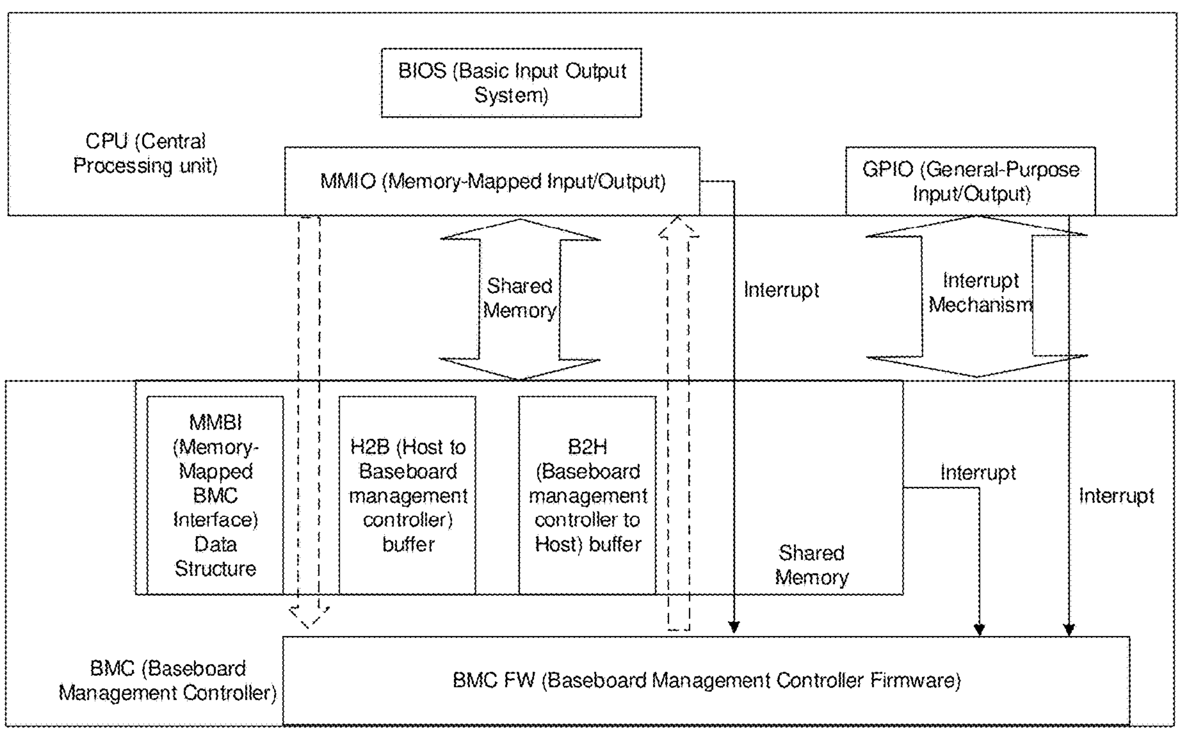
FIG. 5 is a schematic diagram of data exchange of an MMBI shared memory provided according to some embodiments of the present disclosure.
Figure 6:
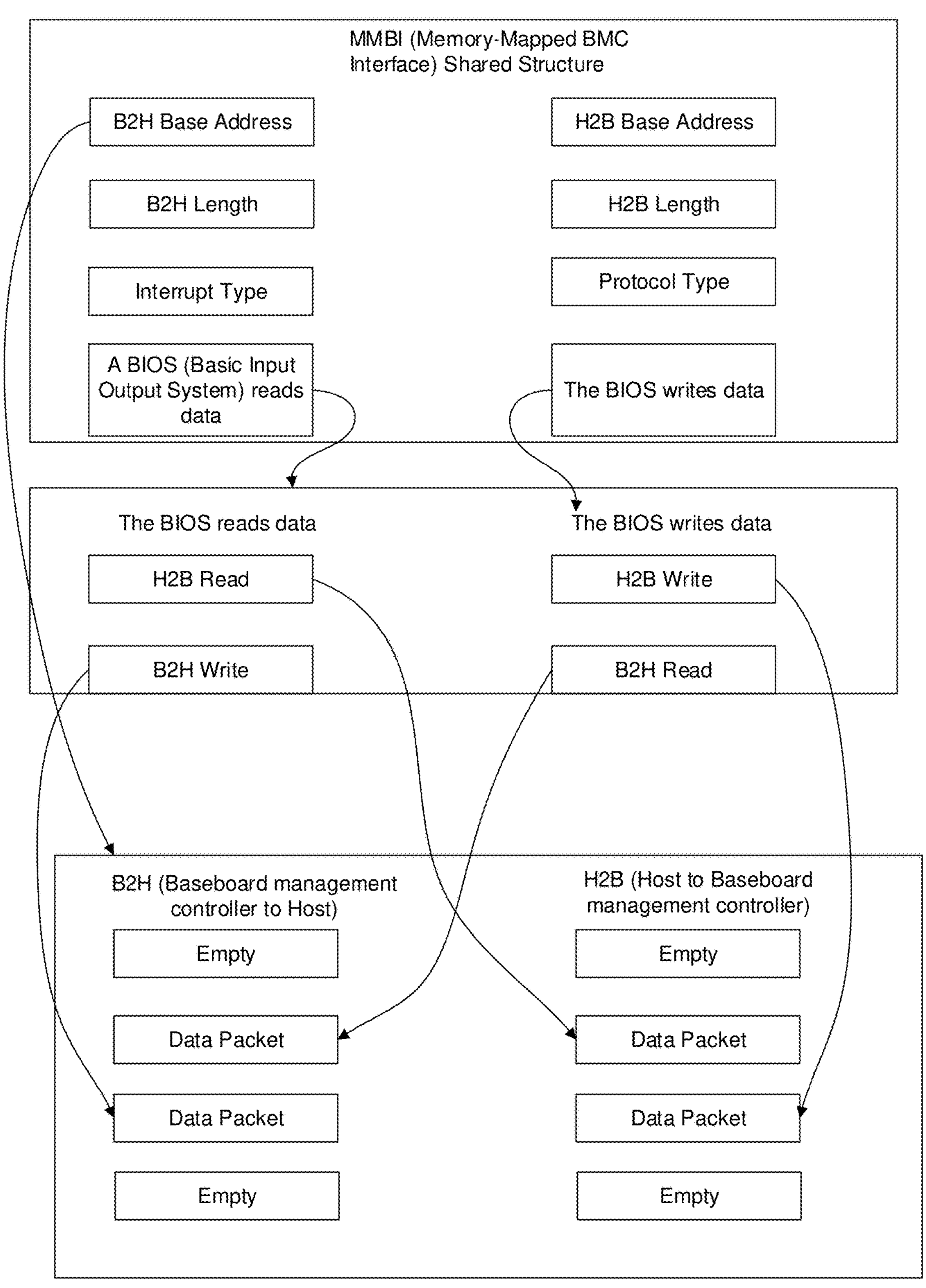
FIG. 6 is a schematic flowchart of data exchange of an MMBI shared memory provided according to some embodiments of the present disclosure.

In some embodiments, please refer to FIGS. 5 and 6, a buffer of the shared memory includes: a first buffer and a second buffer, wherein the first buffer is configured to buffer data transmitted by the baseboard management controller (i.e. B2H), and the second buffer is configured to buffer data received by the baseboard management controller (i.e. H2B).

In the method for recording data of the present embodiment, the data related to RAS function of the server is collected and combined according to a data format of the basic input output system end and the baseboard management controller end, and data exchange is performed by means of H2B and B2H, such that exchange data between the baseboard management controller and the basic input output system can be processed in order via a specific buffer, which facilitates increase of the data recording efficiency.

In some embodiments, the method further includes:

counting time spent waiting by the BIOS for the data packet of the data related to the interrupt to obtain a waiting time; and controlling the server to skip a process of exchanging the data related to RAS function between the BIOS and the BMC, and continue to execute a startup process, in a case where the waiting time exceeds a preset time.

In the method for recording data of the present embodiment, in the case of anomalous data exchange during data exchange between the basic input output system and the baseboard management controller, the waiting time is set to prevent the basic input output system from entering an infinite waiting state, thereby avoiding affecting the startup of the server.

In some embodiments, the method further includes:

controlling the server to skip a process of exchanging the data related to RAS function between the BIOS and the BMC, and continuing to execute a startup process, in a case where the shared memory fails to be initialized.

In the method for recording data in the present embodiment, when initialization of the shared memory fails, by skipping a process of exchanging the data related to RAS function between the basic input output system and the baseboard management controller, and continuing to execute a startup process, the running stability of the server can be improved.

In some embodiments, the preset structure data packet at least includes following information: a defined flag, a defined version, an exchange count, a next data address, a data address of a first buffer, a data address of a second buffer, a data length of the first buffer, a data length of the second buffer, a buffer type, a target buffer type, data read by BIOS, data written by BIOS, a message protocol type, a BIOS interrupt type, global system input data, a BMC interrupt type, a BMC interrupt address, a BMC interrupt value, and a data check value. Exemplarily, for data information included in the preset structure data packet, reference may be made to Table 1.

TABLE 1

| Definition of shared memory MMBI parameters | |
|---|---|
| MMBI BIOS read data parameter (BMC end) | B2H write address |
| | Reservation |
| | BMC initialization signal |
| | H2B read address |
| | Reservation |
| | BMC presence signal |
| | BMC restart signal |
| MMBI packet structure parameter (BMC end) | Reservation |
| | Reservation |
| | Data packet length |
| | Data packet bit |
| | Reservation |

TABLE 1-continued

| Definition of shared memory MMBI parameters | |
|---|---|
| MMBI parameter (BIOS end) | Data packet type<br>Data packet flag<br>MMBI channel<br>MMBI description information<br>Definition flag<br>Definition version<br>Exchange count<br>Next data address<br>B2H data address<br>H2B data address<br>B2H data length<br>H2B data length<br>Buffer type<br>target buffer type<br>data read by BIOS<br>BIOS end write data<br>Message protocol type<br>BIOS end interrupt type<br>Global system input data<br>BMC end interrupt type<br>BMC end interrupt address<br>BMC end interrupt value<br>Data check value |

In still another embodiment, to facilitate understanding of the solutions of the present disclosure, refer to FIGS. 3 and 4 again, the present embodiment provides another method for recording data. The implementation principle of the method is as follows: the effect and limitation of architecture of a server chip are ignored, for the BIOS and BMC, by means of an ESPI bus supported by physical hardware of the main board, when a server is started, the BIOS and the BMC share a fixed memory area via the ESPI bus, and the BMC end and the BIOS end set data packets and parameter meanings corresponding to offset addresses in the data packets for exchange; and the BIOS combines the data related to RAS function according to the established rule and transfers same to the BMC, and the BMC parses the received data according to the established rule and displays same on an interface of the BMC.

An exchange data packet of the BIOS and the BMC is a data packet structure defined by a plurality of parameters such as a defined flag, a defined version, an exchange count, a next data address, a B2H data address, an H2B data address, a B2H data length, an H2B data length, a buffer type, a target buffer type, data read by BIOS, BIOS end write data, a message protocol type, a BIOS end interrupt type, global system input data, a BMC end interrupt type, a BMC end interrupt address, a BMC end interrupt value, and a data check value.

The implementation process is as follows:

first, a main board of a server is connected to a BIOS chip via an ESPI bus, and is connected to a BMC chip via the ESPI bus;

next, when the server is started, the BIOS acquires a startup signal of 1 and a reset signal of 0 in an MMBI capability description address and acquires completion of initialization of the BMC by means of an MMBI target address in a startup phase, and when the described conditions are satisfied, an MMBI area channel exists; if any one of the startup signal of 1 and the reset signal of 0 in the MMBI capability description address and completion of initialization of the BMC, which are acquired by the BIOS by means of the MMBI target address in the startup phase, is not true, the MMBI area channel does not exist and an error state is fed back;

next, a data packet in a buffer register in the MMBI memory area channel is acquired, and data determination is performed on the data packet to determine whether the data packet is empty;

next, when data of the acquired data packet is empty, a request signal is set as 1 and data from the BMC is awaited to be acquired, and after the data transfer from the BMC to the BIOS end is completed, the request signal is set as 0; and finally, when data of the acquired data packet is not empty, that is, when data exists, data of the data packet is filled in according to a format established with the BMC end, the data includes but is not limited to RAS-type error information and RAS-type location information, etc.; and after data writing of the data packet is completed, the RAS-type information of the BIOS is transferred to the BMC end via the MMBI area, the BMC end parses the data according to the established format and displays the related data on a BMC interface, such that a user views the RAS error information records (data related to RAS function) in real time.

According to the method for recording data in this embodiment, two firmware, i.e. the BIOS and the BMC, are physically linked by using the ESPI bus in combination with a hardware design of the main board, data exchange is performed via a shared area mapped by an MMBI memory, and RAS-type error information of the BIOS is combined according to a data format established by both the BIOS and the BMC; when the MMBI shared memory channel exists and complies with communication, the RAS error information recorded by the BIOS is transferred to the BMC for parsing and is displayed on a BMC interface. Moreover, by using the MMBI shared memory channel, a system collected at the BMC end can be reversely transferred to the BIOS via the MMBI shared memory channel, and the BIOS also parses the transferred data according to the established format and records it in a BIOS function. By using this solution, information that the BIOS and the BMC need to exchange can be effectively transferred and updated via the MMBI, which ensures information synchronization between the BIOS and the BMC end. In addition, the present disclosure can satisfy the actual service requirements of customer data centers and only needs to consider any architecture server supporting an ESPI bus, and is highly universal and applicable.

Hereinafter, the apparatus for recording data provided in the present disclosure will be described, and for the apparatus for recording data described below and the method for recording data described above, reference may be made to each other.

Figure 7:
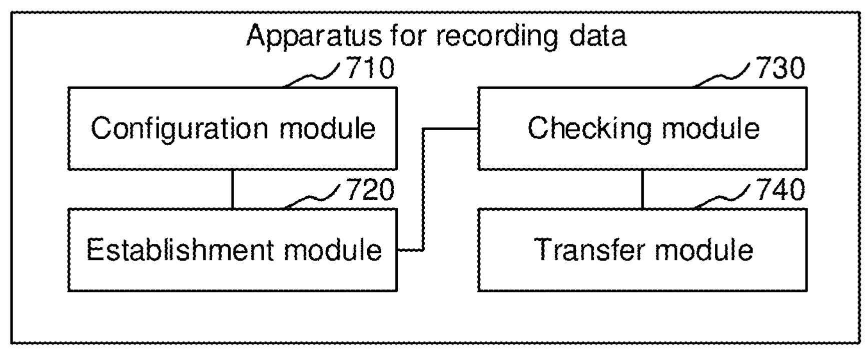
FIG. 7 is a schematic structural diagram of an apparatus for recording data provided according to some embodiments of the present disclosure.

Please refer to FIG. 7, this embodiment provides an apparatus for recording data, and the apparatus includes: a configuration module 710, an establishment module 720, a checking module 730 and a transfer module 740. Hereinafter, the apparatus is described in detail with reference to the modules:

a configuration module 710, the configuration module 710 being configured to respectively configure a BIOS and a BMC to share a shared memory of a CPU respectively, wherein the shared memory is a preset area of a memory mounted by the CPU;

an establishment module 720, the establishment module 720 being configured to establish a rule for using the shared memory for the BIOS and the BMC;

a checking module 730, the checking module 730 being configured to check, in a case where a server is started, a shared channel for the shared memory to determine whether the shared memory is successfully initialized; and a transfer module 740, the transfer module 740 being configured to transfer data related to RAS function collected by the BIOS to the BMC via the shared memory based on the rule for using the shared memory, in a case where the shared memory is successfully initialized.

According to the apparatus for recording data of the present embodiment, first a basic input output system and a baseboard management controller are configured to share a memory mounted under a central processing unit; then a shared memory use rule is established for use of the shared memory by the basic input output system and the baseboard management controller; when a server is started, by means of shared channel check, it is determined whether the shared memory is successfully initialized; and finally, if the shared memory is successfully initialized, by means of the established shared memory use rule, data related to RAS function collected by the basic input output system is transferred to the baseboard management controller, which not only enriches the recording method of RAS-type data, but also enables data related to RAS function records not to be affected or limited by the architecture of a server chip, and has the characteristics of strong universality and high applicability.

In some embodiments, the configuration module 710 is further configured to:

mount at least one memory bank to the CPU on a main board via an inter-integrated circuit (I2C) bus;

respectively connect the BIOS and the BMC to the CPU via a preset bus; and allocate a storage space of the at least one memory bank, which is mapped to the CPU, for shared use by the BIOS and the BMC.

In some embodiments, the preset bus is an Enhanced Serial Peripheral Interface (ESPI) bus or a Low Pin Count (LPC) bus.

In some embodiments, the establishment module 720 is further configured to:

establish a rule that after the BIOS acquires the data related to RAS function, the BIOS encapsulates the data related to RAS function and data related to an interrupt of the BMC into a preset structure data packet based on a preset rule for combining data, and writes the preset structure data packet into the shared memory; and establish a rule that when the BMC reads the shared memory, the BMC parses the preset structure data packet based on a preset rule for parsing data to obtain the data related to RAS function, and displays the data related to RAS function via a management interface.

In some embodiments, the checking module 730 is further configured to:

control the BIOS to read a first preset address of the shared memory in a startup phase to obtain a startup signal of the BMC, a reset signal of the BMC and an initialization state of the BMC;

determine that the shared memory is successfully initialized in a case where the startup signal of the BMC and the reset signal of the BMC and the initialization state of the BMC are all equal to respective corresponding preset values; and determine that the shared memory fails to be initialized in a case where any one of the startup signal of the BMC, the reset signal of the BMC and the initialization state of the BMC is not equal to a corresponding preset value.

In some embodiments, the checking module 730 is further configured to:

control the BMC to read a second preset address of the shared memory in a startup phase to obtain a startup signal of the BIOS, a reset signal of the BIOS and an initialization state of the BIOS;

determine that the shared memory is successfully initialized in a case where the startup signal of the BIOS, the reset signal of the BIOS and the initialization state of the BIOS are all equal to respective corresponding preset values; and determine that the shared memory fails to be initialized in a case where any one of the startup signal of the BIOS, the reset signal of the BIOS and the initialization state of the BIOS is not equal to a corresponding preset value.

In some embodiments, the transfer module 740 is further configured to:

control the BIOS to acquire a data packet of the data related to the interrupt of the BMC from a buffer of the shared memory, and determine whether the data packet is empty;

in response to the data packet being not empty, control the BMC to: acquire, via the shared memory, the preset structure data packet transferred by the BIOS based on the rule for using the shared memory, parse the preset structure data packet based on the rule for using the shared memory to obtain the data related to RAS function, and then display the data related to RAS function via the management interface; and in response to the data packet being empty, control the BIOS to wait for the data packet related to the interrupt.

In some embodiments, the buffer of the shared memory includes: a first buffer and a second buffer, wherein the first buffer is configured to buffer data transmitted by the BMC, and the second buffer is configured to buffer data received by the BMC.

In some embodiments, the apparatus further includes a first startup recovery module, wherein the first startup recovery module is configured to:

counting time spent waiting by the BIOS for the data packet of the data related to the interrupt to obtain a waiting time; and controlling the server to skip a process of exchanging the data related to RAS function between the BIOS and the BMC, and continue to execute a startup process, in a case where the waiting time exceeds a preset time.

In some embodiments, the apparatus further includes a second startup recovery module, wherein the second startup recovery module is configured to:

controlling the server to skip a process of exchanging the data related to RAS function between the BIOS and the BMC, and continuing to execute a startup process, in a case where the shared memory fails to be initialized.

In some embodiments, the data related to RAS function includes RAS-type error information and RAS-type location information.

In some embodiments, the preset structure data packet at least includes following information: a defined flag, a defined version, an exchange count, a next data address, a data address of a first buffer, a data address of a second buffer, a data length of the first buffer, a data length of the second buffer, a buffer type, a target buffer type, data read by BIOS, data written by BIOS, a message protocol type, a BIOS interrupt type, global system input data, a BMC interrupt type, a BMC interrupt address, a BMC interrupt value, and a data check value.

It should be noted that all or some of the modules in the apparatus for recording data may be implemented by software, hardware, or a combination thereof. The modules may be embedded in a processor of an electronic device in a hardware form or independent of the processor of the electronic device, and may also be stored in a memory of the electronic device in a software form, such that the processor invokes same to execute operations corresponding to the modules.

Figure 8:
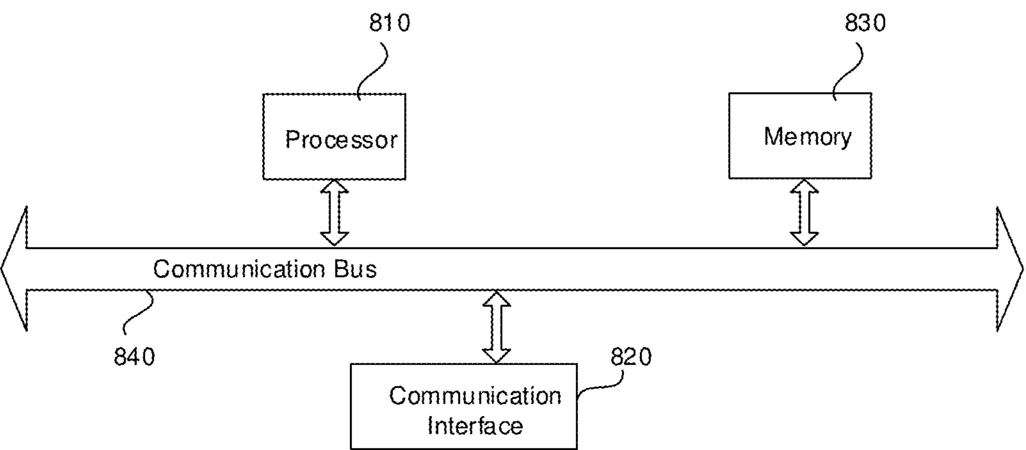
FIG. 8 is a schematic structural diagram of an electronic device provided according to some embodiments of the present disclosure.

FIG. 8 illustrates a physical schematic structural diagram of an electronic device. As shown in FIG. 8, the electronic device may include: a processor 810, a communications interface 820, a memory 830, and a communications bus 840, wherein the processor 810, the communications interface 820, and the memory 830 communicate with each other via the communications bus 840. The processor 810 may invoke logic instructions in the memory 830 to execute the method for recording data. The method includes: respectively configuring a Basic Input Output System (BIOS) and a Baseboard Management Controller (BMC) to share a shared memory of a Central Processing Unit (CPU), wherein the shared memory is a preset area of a memory mounted by the CPU; establishing a rule for using the shared memory for the BIOS and the BMC; in a case where a server is started, checking a shared channel for the shared memory to determine whether the shared memory is successfully initialized; and transferring data related to a Reliability, Availability and Serviceability (RAS) function collected by the BIOS to the BMC via the shared memory based on the rule for using the shared memory, in a case where the shared memory is successfully initialized.

In addition, when the logic instructions in the memory 830 may be implemented in the form of a software functional unit and is sold or used as an independent product, the logic instructions can be stored in a non-transitory computer readable storage medium. On the basis of such understanding, the technical solution of the present disclosure in nature, or the portion contributed to the related art, or part of the technical solution can be embodied in the form of a software product, and the computer software product is stored in a non-transitory computer readable storage medium, and includes several instructions for causing a computer device (which may be a personal computer, a server, or a network device, etc.) to execute all or some of the steps of the method in the embodiments of the present disclosure. Moreover, the non-transitory computer readable storage medium above includes: non-transitory readable storage media such as a USB flash disk, a mobile hard disk, a Read-Only Memory (ROM), a Random Access Memory (RAM), a magnetic disk, or an optical disk, and the like which can store program codes.

In another aspect, the present disclosure further provides a computer program product, wherein the computer program product includes a computer program, the computer program may be stored in a non-transitory computer readable storage medium, and when the computer program is executed by a processor, a computer can execute the method for recording data provided by the described method. The method includes: respectively configuring a Basic Input Output System (BIOS) and a Baseboard Management Controller (BMC) to share a shared memory of a Central Processing Unit (CPU), wherein the shared memory is a preset area of a memory mounted by the CPU; establishing a rule for using the shared memory for the BIOS and the BMC; in a case where a server is started, checking a shared channel for the shared memory to determine whether the shared memory is successfully initialized; and transferring data related to Reliability, Availability and Serviceability (RAS) function collected by the BIOS to the BMC via the shared memory based on the rule for using the shared memory, in a case where the shared memory is successfully initialized.

In another aspect, the present disclosure further provides a non-transitory computer readable storage medium, on which a computer program is stored, wherein the computer program, when executed by a processor, is used to implement the method for recording data provided by the foregoing method. The method includes: respectively configuring a Basic Input Output System (BIOS) and a Baseboard Management Controller (BMC) to share a shared memory of a Central Processing Unit (CPU), wherein the shared memory is a preset area of a memory mounted by the CPU; establishing a rule for using the shared memory for the BIOS and the BMC; in a case where a server is started, checking a shared channel for the shared memory to determine whether the shared memory is successfully initialized; and transferring data related to Reliability, Availability and Serviceability (RAS) function collected by the BIOS to the BMC via the shared memory based on the rule for using the shared memory, in a case where the shared memory is successfully initialized.

The apparatus embodiments as described above are merely exemplary. The units described as separate components may or may not be physically separated, and the components displayed as units may or may not be physical units, that is, may be located in one place, or may be distributed to multiple network units. Some or all of the modules may be selected according to actual needs to achieve the purpose of the solutions of the embodiments. A person of ordinary skill in the art would understand and implement the embodiments without any inventive effort.

From the description of the described embodiments, a person skilled in the art would have been able to clearly understand that the embodiments may be implemented by using software and necessary general hardware platforms, and of course may also be implemented using hardware. On the basis of such understanding, the portion of the technical solution that contributes in essence or to the related art may be embodied in the form of a software product, the computer software product may be stored in a non-transitory computer readable storage medium (such as an ROM/RAM, a magnetic disk and an optical disc); and the storage medium includes several instructions to cause a computer device (which may be a personal computer, a server or a network device, etc.) to perform the method described according to the embodiments or some parts of the embodiments.

Finally, it should be noted that the embodiments above are only used to illustrate rather than limit the technical solutions of the present disclosure. Although the present disclosure has been explained in detail with reference to the embodiments above, a person of ordinary skill in the art would have understood: they still could modify the technical solutions disclosed in the described embodiments or make equivalent replacements to some technical features therein. Moreover, these modifications or replacements shall not render that the nature of the corresponding technical solutions departs from the spirit and scope of the technical solutions in embodiments of the present disclosure.

The invention claimed is:

1. A method for recording data, comprising:

respectively configuring a Basic Input Output System (BIOS) and a Baseboard Management Controller (BMC) to share a shared memory of a Central Processing Unit (CPU), wherein the shared memory is a preset area of a memory mounted by the CPU;

establishing a rule for using the shared memory for the BIOS and the BMC;

in a case where a server is started, checking a shared channel for the shared memory to determine whether the shared memory is successfully initialized; and transferring data related to Reliability, Availability and Serviceability (RAS) function collected by the BIOS to the BMC via the shared memory based on the rule for using the shared memory, in a case where the shared memory is successfully initialized;

wherein establishing the rule for using the shared memory for the BIOS and the BMC, comprises:

establishing a rule that after the BIOS acquires the data related to RAS function, the BIOS encapsulates the data related to RAS function and data related to an interrupt of the BMC into a preset structure data packet based on a preset rule for combining data, and writes the preset structure data packet into the shared memory; and establishing a rule that when the BMC reads the shared memory, the BMC parses the preset structure data packet based on a preset rule for parsing data to obtain the data related to RAS function, and displays the data related to RAS function via a management interface.

2. The method for recording data according to claim 1, wherein respectively configuring the BIOS and the BMC to share the shared memory of the CPU, comprises:

mounting at least one memory bank to the CPU on a main board via an inter-integrated circuit (I2C) bus;

respectively connecting the BIOS and the BMC to the CPU via a preset bus; and allocating a storage space of the at least one memory bank, which is mapped to the CPU, for shared use by the BIOS and the BMC.

3. The method for recording data according to claim 2, wherein the preset bus is an Enhanced Serial Peripheral Interface (ESPI) bus or a Low Pin Count (LPC) bus.

4. An electronic device, comprising a memory, a processor, and a computer program stored on the memory and executable on the processor, wherein the processor implements the method for recording data according to claim 3 when executing the computer program.

5. An electronic device, comprising a memory, a processor, and a computer program stored on the memory and executable on the processor, wherein the processor implements the method for recording data according to claim 2 when executing the computer program.

6. The method for recording data according to claim 1, wherein in a case where the server is started, checking the shared channel for the shared memory to determine whether the shared memory is successfully initialized, comprises:

controlling the BIOS to read a first preset address of the shared memory in a startup phase to obtain a startup signal of the BMC, a reset signal of the BMC and an initialization state of the BMC;

determining that the shared memory is successfully initialized in a case where the startup signal of the BMC and the reset signal of the BMC and the initialization state of the BMC are all equal to respective corresponding preset values; and determining that the shared memory fails to be initialized in a case where any one of the startup signal of the BMC, the reset signal of the BMC and the initialization state of the BMC is not equal to a corresponding preset value.

7. The method for recording data according to claim 1, wherein in a case where the server is started, checking the shared channel for the shared memory to determine whether the shared memory is successfully initialized, comprises:

controlling the BMC to read a second preset address of the shared memory in a startup phase to obtain a startup signal of the BIOS, a reset signal of the BIOS and an initialization state of the BIOS;

determining that the shared memory is successfully initialized in a case where the startup signal of the BIOS, the reset signal of the BIOS and the initialization state of the BIOS are all equal to respective corresponding preset values; and determining that the shared memory fails to be initialized in a case where any one of the startup signal of the BIOS, the reset signal of the BIOS and the initialization state of the BIOS is not equal to a corresponding preset value.

8. The method for recording data according to claim 1, wherein the shared channel comprises data communication channels respectively from the BIOS and the BMC to the shared memory.

9. The method for recording data according to claim 1, wherein in a case where the server is started, checking the shared channel for the shared memory to determine whether the shared memory is successfully initialized, comprises:

detecting whether the shared channel exists;

determining that the shared memory is successfully initialized in a case where the shared channel is detected; and determining that the shared memory fails to be initialized in a case where the shared channel is not detected.

10. The method for recording data according to claim 9, wherein detecting whether the shared channel exists, comprises:

detecting whether a data communication channel from the BIOS to the shared memory exists, and detecting whether a data communication channel from the BMC to the shared memory exists; and determining that the shared channel is detected in a case where both the data communication channel from the BIOS to the shared memory and the data communication channel from the BMC to the shared memory exist.

11. The method for recording data according to claim 1, wherein transferring the data related to RAS function collected by the BIOS to the BMC based on the rule for using the shared memory via the shared memory, comprises:

controlling the BIOS to acquire a data packet of the data related to the interrupt of the BMC from a buffer of the shared memory, and determine whether the data packet is empty;

in response to the data packet being not empty, controlling the BMC to: acquire, via the shared memory, the preset structure data packet transferred by the BIOS based on the rule for using the shared memory, parse the preset structure data packet based on the rule for using the shared memory to obtain the data related to RAS function, and then display the data related to RAS function via the management interface; and in response to the data packet being empty, controlling the BIOS to wait for the data packet related to the interrupt.

12. The method for recording data according to claim 11, wherein the buffer of the shared memory comprises: a first buffer and a second buffer, wherein the first buffer is configured to buffer data transmitted by the BMC, and the second buffer is configured to buffer data received by the BMC.

13. The method for recording data according to claim 11, wherein the method further comprises:

counting time spent waiting by the BIOS for the data packet of the data related to the interrupt to obtain a waiting time; and controlling the server to skip a process of exchanging the data related to RAS function between the BIOS and the BMC, and continue to execute a startup process, in a case where the waiting time exceeds a preset time.

14. The method for recording data according to claim 1, wherein the method further comprises:

controlling the server to skip a process of exchanging the data related to RAS function between the BIOS and the BMC, and continuing to execute a startup process, in a case where the shared memory fails to be initialized.

15. The method for recording data according to claim 1, wherein the data related to RAS function comprises RAS-type error information and RAS-type location information.

16. The method for recording data according to claim 1, wherein the preset structure data packet at least comprises following information: a defined flag, a defined version, an exchange count, a next data address, a data address of a first buffer, a data address of a second buffer, a data length of the first buffer, a data length of the second buffer, a buffer type, a target buffer type, data read by BIOS, data written by BIOS, a message protocol type, a BIOS interrupt type, global system input data, a BMC interrupt type, a BMC interrupt address, a BMC interrupt value, and a data check value.

17. The method for recording data according to claim 1, wherein the rule for using the shared memory defines a manner that the BIOS and the BMC perform data exchange via one or more data packets of a preset format.

18. The method for recording data according to claim 1, wherein the preset area is a storage area formed by a segment of contiguous addresses, or the preset area is a storage area formed by multiple non-contiguous segments of addresses.

19. An electronic device, comprising a memory, a processor, and a computer program stored on the memory and executable on the processor, wherein the processor implements the method for recording data according to claim 1 when executing the computer program.

20. A non-transitory computer readable storage medium, wherein the non-transitory computer readable storage medium stores a computer program, the computer program, when executed by a processor, implements the method for recording data according to claim 1.

* * * * *